July 18, 1933.  O. GERLINE  1,918,389
FISHING ROD SUPPORT
Filed Jan. 8, 1932  2 Sheets-Sheet 2
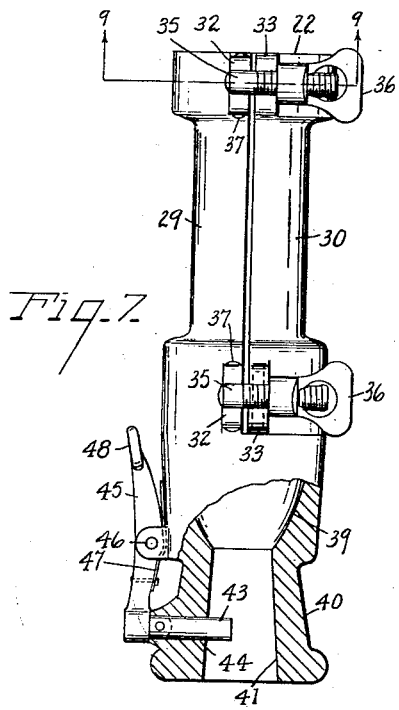
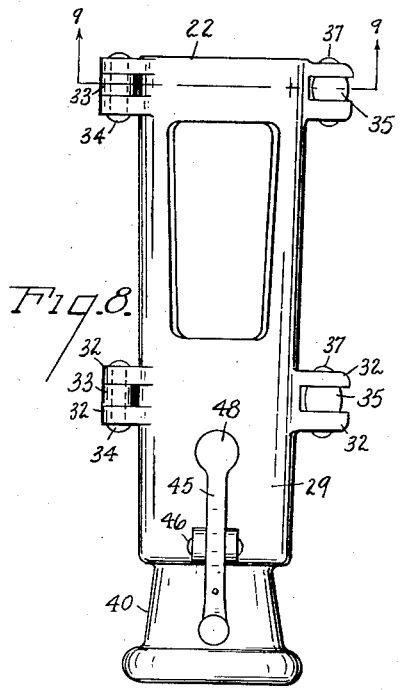
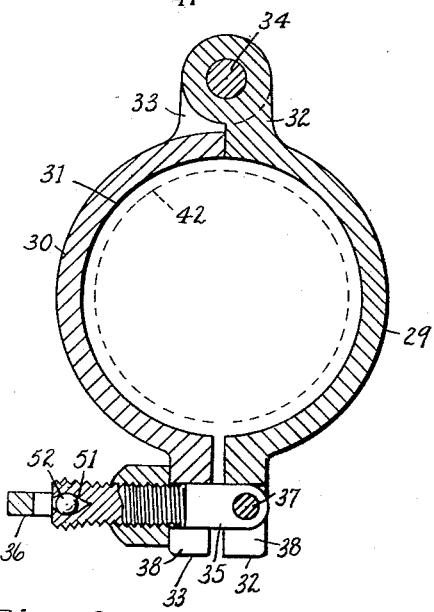
INVENTOR
Otto Gerline
BY
Chappell & Earl
ATTORNEYS Patented July 18, 1933

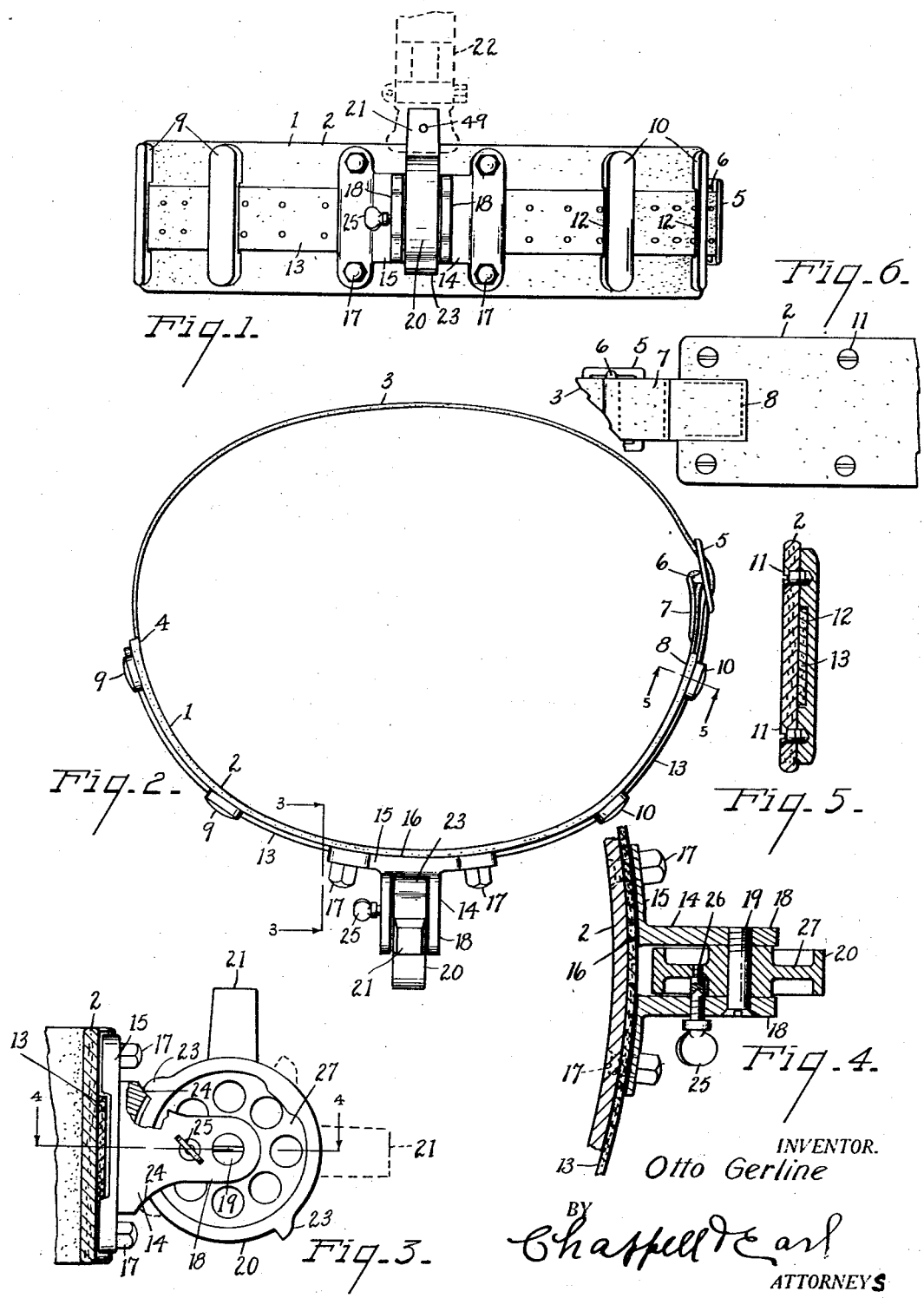

1,918,389

UNITED STATES PATENT OFFICE

OTTO GERLINE, OF KALAMAZOO, MICHIGAN

FISHING ROD SUPPORT

Application filed January 8, 1932. Serial No. 585,435.

The main object of my invention is to provide an improved fishing rod support adapted to be worn about the waist of the user.

Another object is to provide a device of this character, which, when properly adjusted about the waist of the wearer, will not slide up or down nor twist or turn, thereby assisting materially in the trolling and handling of large fish.

A further object is to provide an improved fishing rod support which is simple and economical in construction yet efficient and effective in operation.

Objects relating to details and economies of my invention will appear from the description to follow. The invention is defined and pointed out in the claims.

A structure which is a preferred embodiment of my invention is illustrated in the accompanying drawings, in which:

Fig. 1 is a front elevation of a belt embodying my invention.

Fig. 2 is a top plan view.

Fig. 3 is a fragmentary view partly in side elevation and partly in vertical section taken on a line corresponding to line 3—3 of Fig. 2.

Fig. 4 is a fragmentary horizontal section taken on line 4—4 of Fig. 3.

Fig. 5 is an enlarged transverse vertical section taken on a line corresponding to line 5—5 of Fig. 2.

Fig. 6 is a fragmentary inside elevation of the belt.

Fig. 7 is an enlarged top plan of the rod support partially broken away.

Fig. 8 is a side elevation of the support, and

Fig. 9 is an enlarged transverse section taken on a line corresponding to line 9—9 of Figs. 7 and 8.

Referring to the drawings, which illustrate my improved fishing rod support, numeral 1 indicates a belt having a relatively wide and stiff front portion 2 and a flexible strap portion 3 connected to the front portion at 4. The other end of the flexible portion is adjustably secured to the front portion by the buckle 5. The buckle 5 is of well known type, the central vertical cross member 6 thereof being connected to the front portion 2 by the relatively short flexible strap 7 which is sewed or otherwise secured to the inside of the front portion 2 at 8.

On either side of the center of the front portion 2, spaced vertical reinforcing ribs 9 and 10 are provided which are secured to the front portion by screws 11, as indicated by Fig. 5. The ribs 9 and 10 are provided at their inner surfaces with recesses 12 which coact with the outside of the front portion 2 to provide loops or keepers for retaining the free end 13 of the strap extending forwardly from the buckle 5 adjacent to the front portion 2.

The front portion 2 is preferably made of two-ply oak tan water-proofed leather belting and the ribs are of brass provided with a rust-proof coating of chromium or the like.

A rod supporting bracket 14 is provided with a base 15 having an arched inner surface 16 which is secured to the outside of the front portion 2 at about the center thereof by screws 17. The base 15 includes end members of a length approximating the width of the front portion and secured thereto by the bolts 17 whereby to constitute stiffening and reinforcing members therefor. The inside of the base 15 is provided with a longitudinal recess for the passage of the strap 13. The bracket 14 has forwardly extending spaced arms 18 to and between which is secured the screw 19 constituting a pivot for the rod supporting member 20 which is preferably wheel-like in form. The periphery of the wheel is provided with a non-circular stud 21 which is adapted to carry the rod holder 22. The rotational movement of the rod supporting member 20 is limited to about 90° by the integral diametrically opposed lugs 23 on the periphery thereof which are adapted to coact with suitable stops 24.

Means are provided for securing the member 20 with the stud 21 in a vertical position, as shown by Fig. 3, which preferably comprises the thumb screw 25 threaded to an opening provided in one of the arms 18. The end of the screw 25 is pointed for engaging the conical socket in the screw 26 threaded to an opening in the web 27 of support 20. When it is desired to oscillate the wheel 20 between its stops, the screw 25 is backed off so that its end clears the socket in screw 26.

The fishing rod or pole is connected to the stud 21 by the rod holder 22 which is illustrated in detail by Figs. 7 to 9, inclusive. The rod holder 22 preferably consists of a base member 29 and a clamping member 30. The outer walls of the members 29 and 30 are preferably semi-circular in shape to provide a rod receiving socket 31. The edges of the members 29 and 30 are provided with radial lugs 32 and 33, the registering lugs at one side being pivotally connected by the pins 34, whereby to hinge the clamping member 30 to the base member 29 and the other registering lugs being provided with clamping hinged bolts 35 having winged nuts 36 whereby to adjustably clamp the clamping member 30 in supporting engagement with the butt end of the pole. The bolts are pivoted to the base lugs at 37 and extend through the slots 38 provided therefor in the clamping lugs. The base 39 of the socket 31 is of conical shape to provide a centering device of the end of the fishing pole, regardless of its shape and size. This facilitates the clamping of the pole in the holder.

Integral with the base member 29 is a flared cup-like extension 40 having a socket 41 of non-circular section for receiving the non-circular stud 21. The inside of the socket 31 may be provided with a lining 42 of felt, rubber, leather, or the like for obviating injury to the butt of the pole due to the clamping action of the nuts 36.

In the clamping means illustrated, the lugs 32 are provided with alined slots and the bolts 35 are pivoted at 37 in one of the slots so as to extend through the other, as shown by Fig. 9. The bolts 35 are provided with wing clamping nuts having shoulders engaging the edges of the slots. With this arrangement, the clamping member 30 may be swung open relative to the base member 29 by simply loosening the nuts enough to permit the bolts to be swung clear of the lugs on the clamping member.

The ends of the bolts 35 are outset by the balls 52 disposed in the end recesses 51 to prevent the turning of the nuts 36 off the bolts.

The holder 22 is secured to the stud 21 by the bolt 43 slidably disposed in the radial opening 44 in the wall of the extension 40. The bolt 43 is carried by the lower end of the lever 45 which is pivoted to the base member at 46 and is resiliently pressed counter-clockwise by the leaf-spring 47 disposed thereunder and carried by the base member. The lever 45 has a finger piece 48 for swinging the lever against the force of spring 47 to release the bolt 43 from engagement with its socket 49 in the stud 21, thereby permitting the rod and holder to be withdrawn from the belt.

The design and construction of my improved fishing rod support is such that it can neither go up or down nor twist or turn, thereby assisting materially in pumping and handling large fish. If the wearer occupies a sitting position, the belt rests on his legs. It may be successfully used in surf fishing as well as trolling, and the device may be arranged to hold the rod in a vertical position leaving the hands of the wearer free for other work such as carrying additional fishing equipment or the like. Further, the belt is highly attractive in appearance and is strong and rugged.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent is:

1. A fishing rod support, comprising a relatively wide and stiff front belt portion and a flexible strap portion connected to the ends of said front portion, at least one connection being adjustable, a rod supporting bracket mounted centrally on said front portion and having a base including end members of a length approximating the width of the front portion and secured thereto to constitute stiffening and reinforcing members therefor, transversely disposed reinforcing ribs secured to said front portion in spaced relation to said bracket and to each other, certain of said ribs being located adjacent the ends of said front portion, said ribs and bracket being recessed on their inner sides to receive the end of the strap whereby they constitute retaining loops therefor, a rod supporting member pivoted to said bracket and having spaced stops coacting with stops on said bracket, and a rod holder detachably mounted on said support.

2. A fishing rod support, comprising a relatively wide and stiff front belt portion and a flexible strap portion connected to the ends of said front portion, at least one connection being adjustable, a rod supporting bracket mounted centrally on said front portion, transversely disposed reinforcing ribs secured to said front portion in spaced relation to said bracket and to each other, certain of said ribs being located adjacent the ends of said front portion, said ribs and bracket being recessed on their inner sides to receive the end of the strap whereby they constitute retaining loops therefor, a rod supporting member pivoted to said bracket and having spaced stops coacting with stops on said bracket, and a rod holder detachably mounted on said support.

3. A fishing rod support, comprising a relatively wide and stiff front belt portion and a flexible strap portion connected to the ends of said front portion, at least one connection being adjustable, a rod supporting bracket mounted centrally on said front portion and having a base including end members of a length approximating the width of the front portion and secured thereto to constitute stiffening and reinforcing members therefor, transversely disposed reinforcing ribs secured to said front portion in spaced relation to said bracket and to each other, certain of said ribs being located adjacent the ends of said front portion, said ribs and bracket being recessed on their inner sides to receive the end of the strap whereby they constitute retaining loops therefor.

4. A fishing rod support, comprising a relatively wide and stiff front belt portion and a flexible strap portion connected to the ends of said front portion, at least one connection being adjustable, a rod supporting bracket mounted centrally on said front portion, transversely disposed reinforcing ribs secured to said front portion in spaced relation to said bracket and to each other, certain of said ribs being located adjacent the ends of said front portion, said ribs and bracket being recessed on their inner sides to receive the end of the strap whereby they constitute retaining loops therefor.

5. A fishing rod support, comprising a relatively wide and stiff front belt portion and a strap portion connected to the ends of said front portion, at least one connection being adjustable, a rod supporting bracket mounted centrally on said front portion and having a base including end members of a length approximating the width of the front portion and secured thereto to constitute stiffening and reinforcing members therefor, and transversely disposed reinforcing ribs secured to said front portion adjacent the ends thereof, said ribs and bracket being recessed on their inner sides to receive the end of the strap whereby they constitute retaining loops therefor.

6. A fishing rod support, comprising a relatively wide and stiff front belt portion and a strap portion connected to the ends of said front portion, at least one connection being adjustable, a rod supporting bracket mounted centrally on said front portion, and transversely disposed reinforcing ribs secured to said front portion adjacent the ends thereof, said ribs and bracket being recessed on their inner sides to receive the end of the strap whereby they constitute retaining loops therefor.

7. A fishing rod support, comprising a relatively wide, unbroken, and stiff front belt portion and a strap portion connected to the ends of said front portion, a rod supporting bracket mounted centrally on said front portion and having a base including end members of a length approximating the width of the front portion and secured thereto to constitute stiffening and reinforcing members therefor, transversely disposed reinforcing ribs secured to said front portion, certain of said ribs being located adjacent the ends of said front portion, a rod supporting member pivoted to said bracket to swing in a plane normal to said belt and having spaced stops coacting with stops on said bracket, and a rod holder detachably mounted on said supporting member.

8. A fishing rod support, comprising a relatively wide, unbroken, and stiff front belt portion and a strap portion connected to the ends of said front portion, a rod supporting bracket mounted centrally on said front portion, transversely disposed reinforcing ribs secured to said front portion adjacent the ends of said front portion, a rod supporting member pivoted to said bracket to swing in a plane normal to said belt and having spaced stops coacting with stops on said bracket, and a rod holder detachably mounted on said supporting member.

9. In a device of the class described, the combination of a bracket provided with spaced stops, a supporting member pivotally mounted on said bracket and having spaced stops coacting with said stops on said bracket to limit the movement of said supporting member, said supporting member having a non-circular radially projecting stud, a rod holder having at its inner end a non-circular stud engaging socket adapted to receive said stud on said supporting member and a rod socket having a cylindrical outer portion and an inwardly tapered inner portion, the cylindrical portion comprising a pair of segmental parts one of which is hinged and provided with adjustable means for clamping a rod within the socket, and a pin mounted on said holder for detachably securing it to said rod.

10. In a device of the class described, the combination of a bracket provided with spaced stops, a supporting member pivotally mounted on said bracket and having spaced stops coacting with said stops on said bracket to limit the movement of said supporting member, said supporting member having a non-circular radially projecting stud, and a rod holder having at its inner end a stud engaging socket adapted to receive said stud on said supporting member and a rod socket having a cylindrical outer portion and an inwardly tapered inner portion, the cylindrical portion comprising a pair of segmental parts one of which is hinged and provided with adjustable means for clamping a rod within the socket.

11. A fishing rod holder provided with a non-circular socket adapted to receive a supporting stud and an outwardly facing rod socket having an inwardly tapered portion at the inner end and a semi-cylindrical wall beyond said tapered portion, the edges of said wall having radial lugs, a clamping member having a semi-cylindrical wall registering with said first-named wall and having radial lugs coacting with the radial lugs on said wall, means pivoting the lugs on one side whereby to longitudinally hinge said clamping member, and clamping means coacting with the lugs on the other side for adjusting said clamping member to a rod disposed in the socket.

12. A fishing rod holder provided with a non-circular socket adapted to receive a supporting stud and an outwardly facing rod socket having a semi-cylindrical wall, the edges of said wall having radial lugs, a clamping member having a semi-cylindrical wall registering with said first-named wall and having radial lugs coacting with the radial lugs on said wall, means pivoting the lugs on one side whereby to longitudinally hinge said clamping member, and clamping means coacting with the lugs on the other side for adjusting said clamping member to a rod disposed in the socket.

13. A fishing rod holder provided with a socket adapted to receive a supporting stud and an outwardly facing rod socket having an inwardly tapered portion at the inner end and a semi-cylindrical wall beyond said tapered portion, the edges of said wall having radial lugs, a hinged clamping member having a semi-cylindrical wall registering with said first-named wall, and means for clamping said wall to a rod disposed in the socket.

OTTO GERLINE.